UNITED STATES PATENT OFFICE.

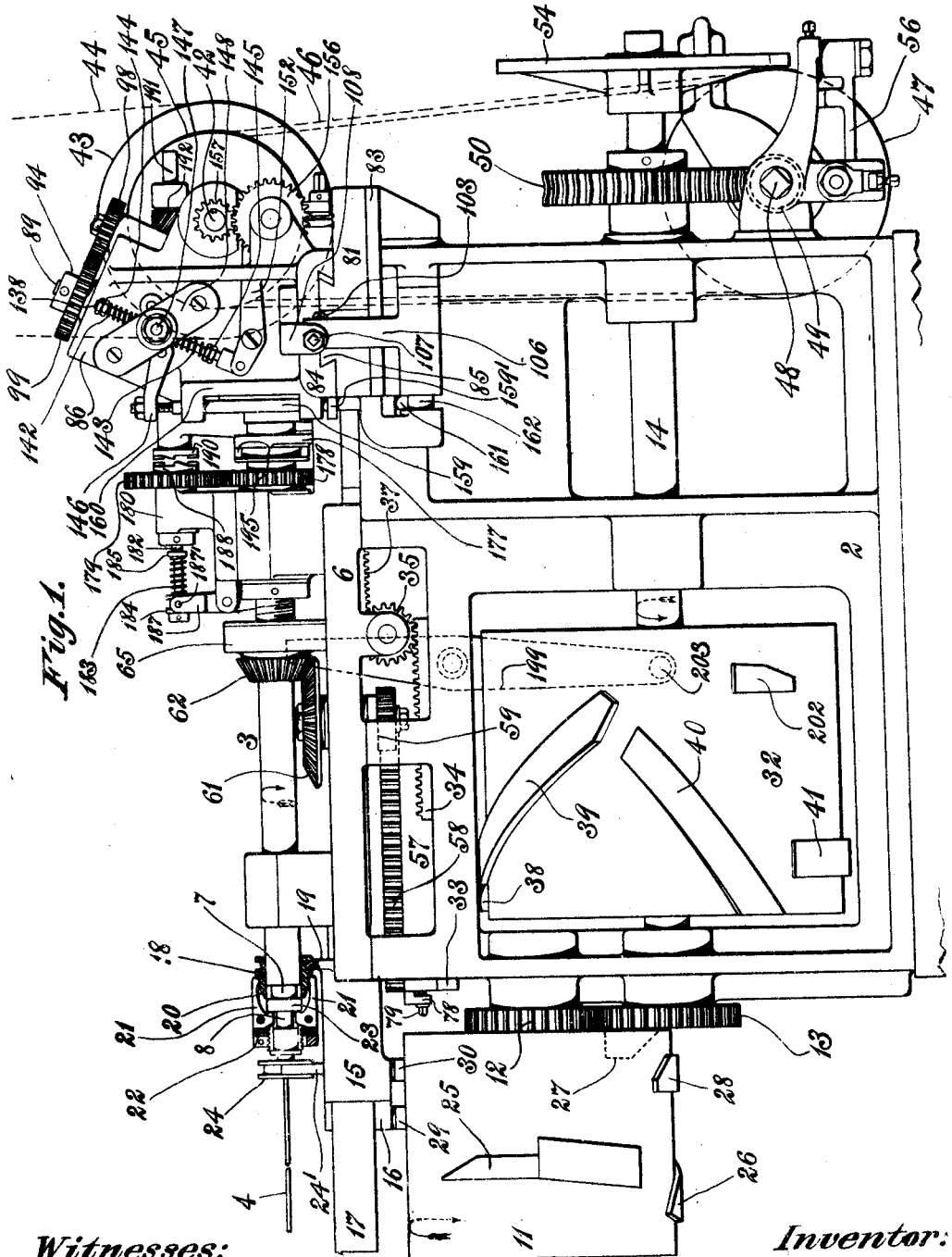

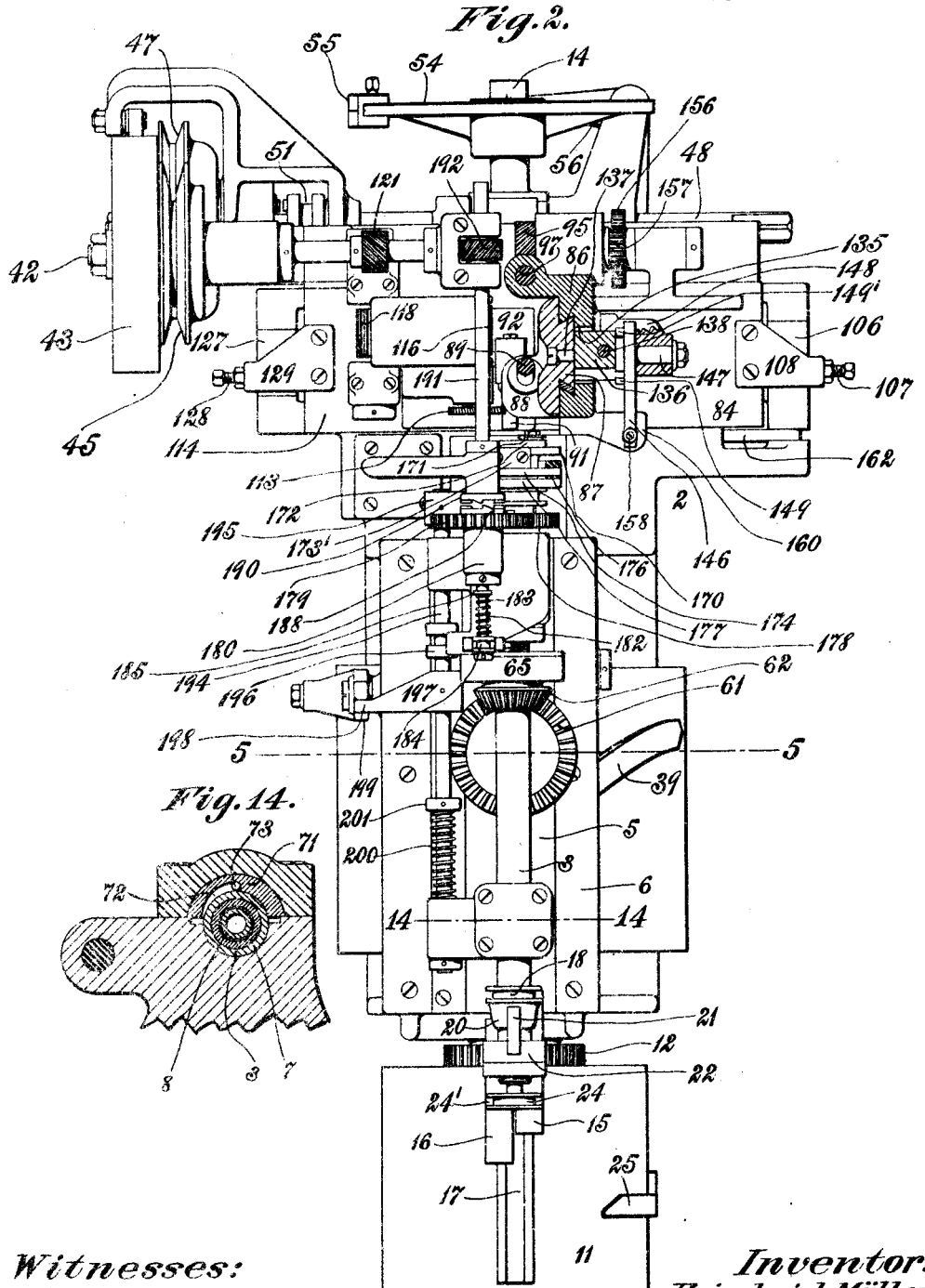

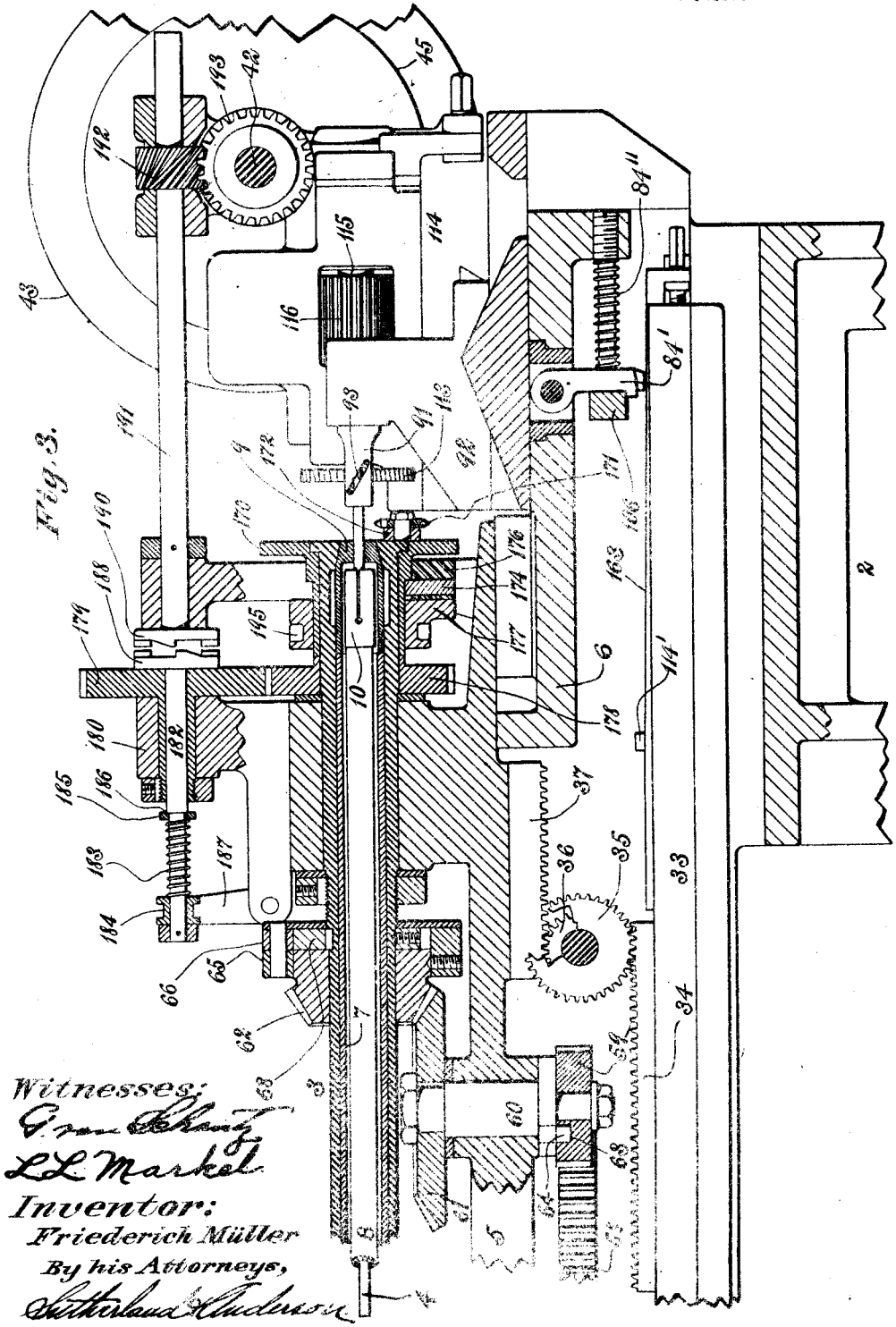

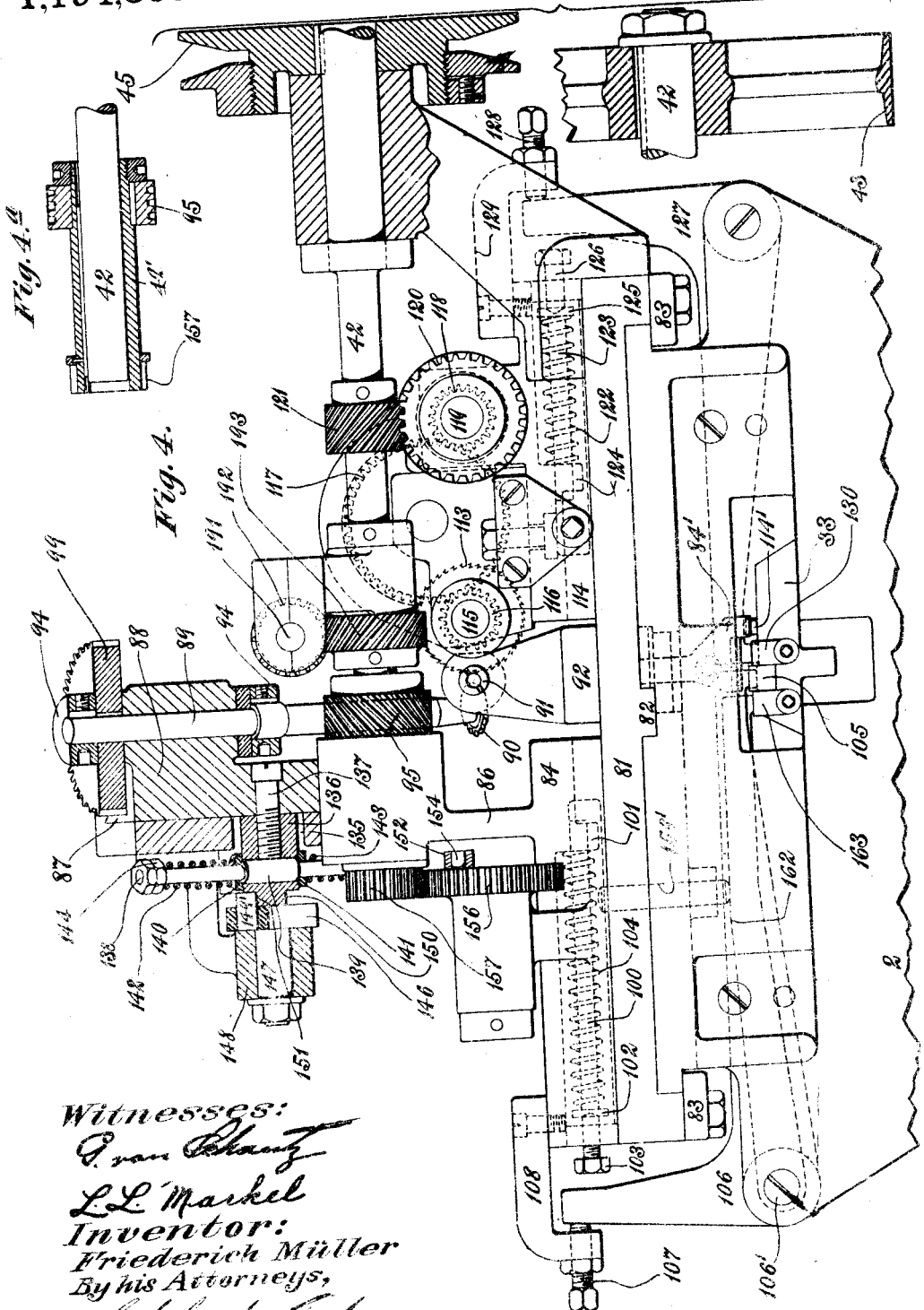

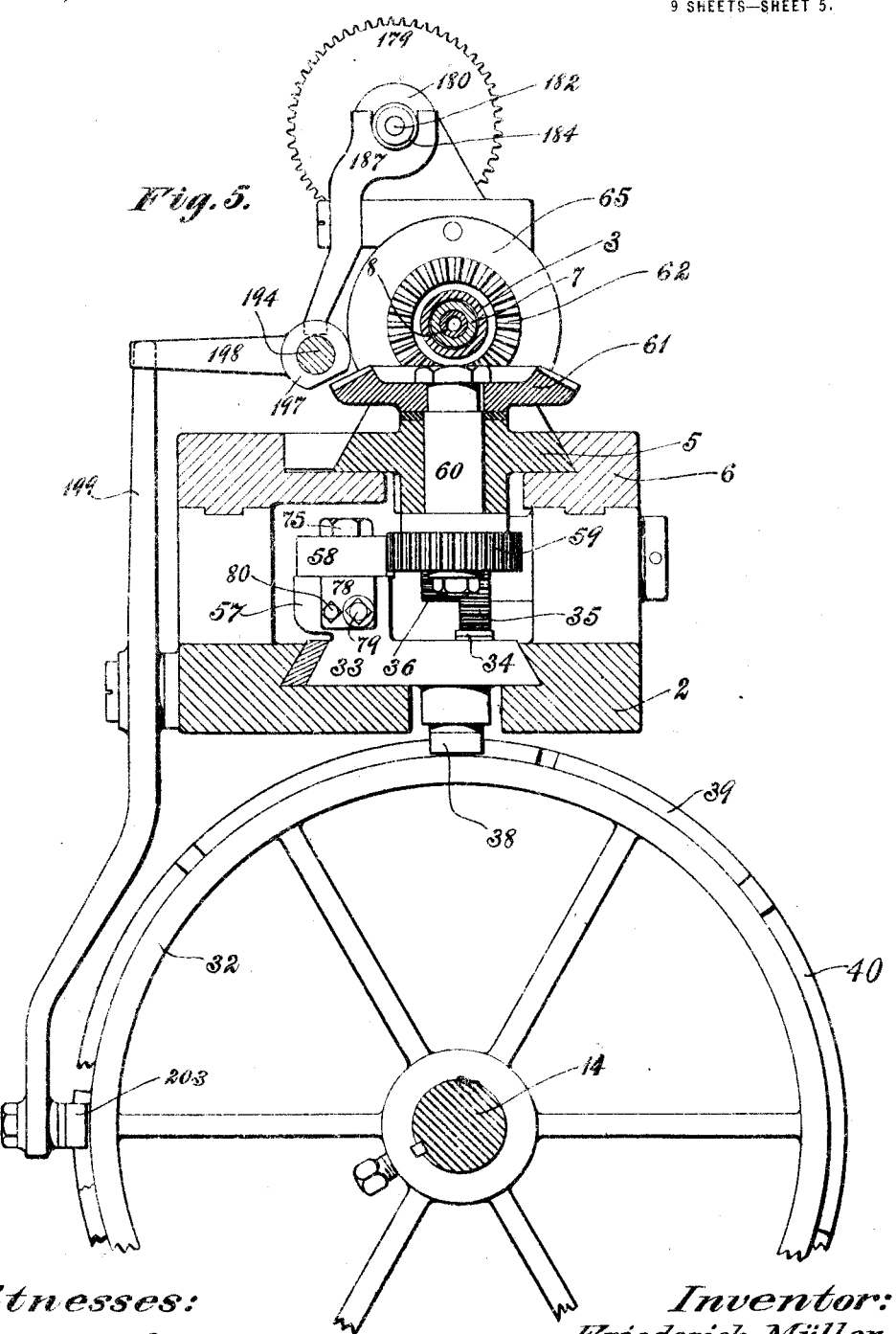

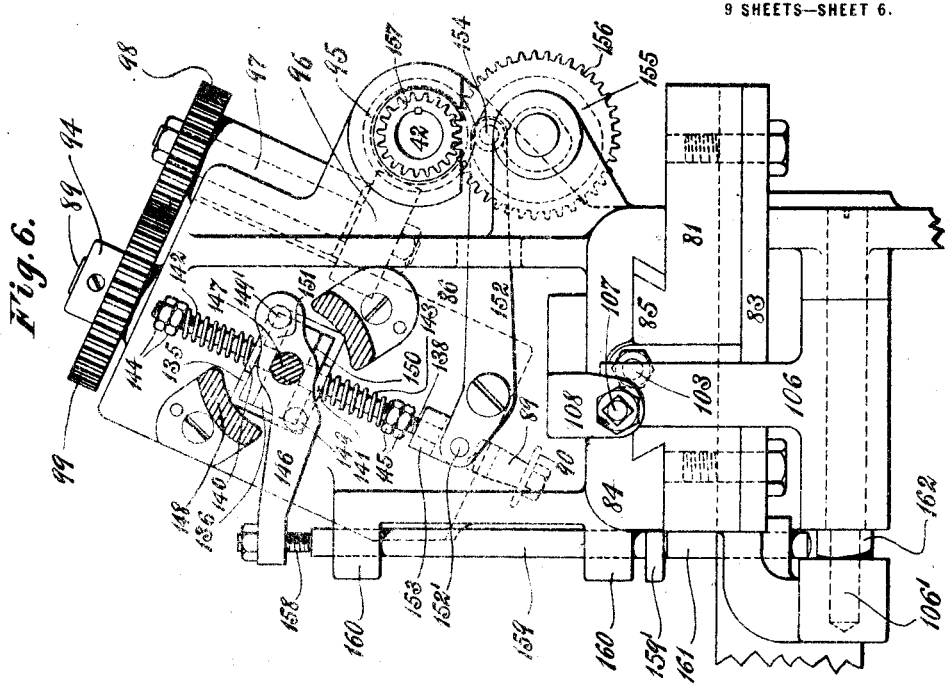
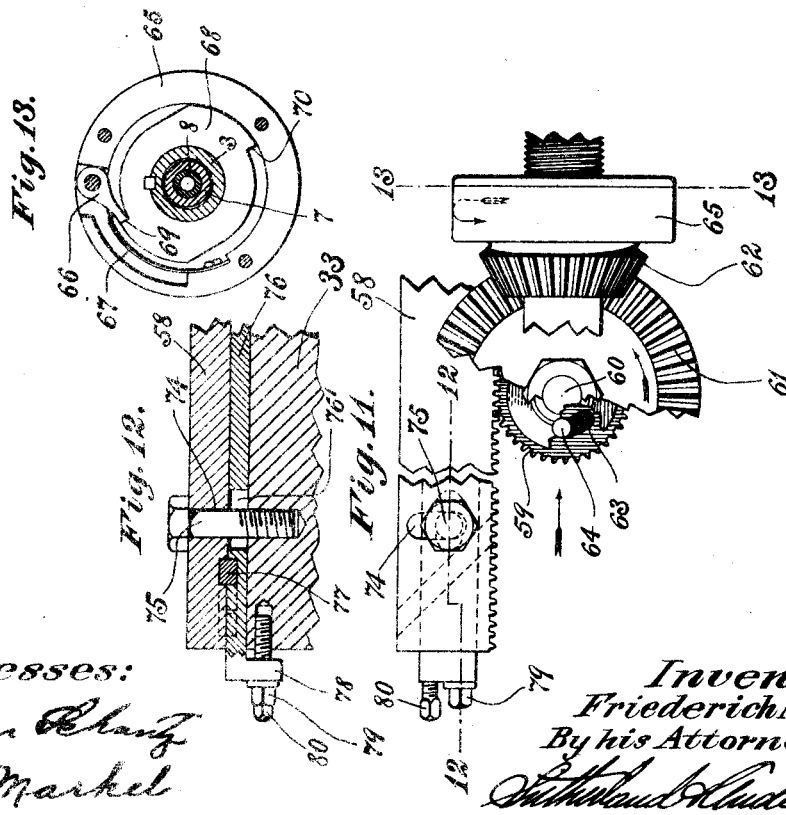

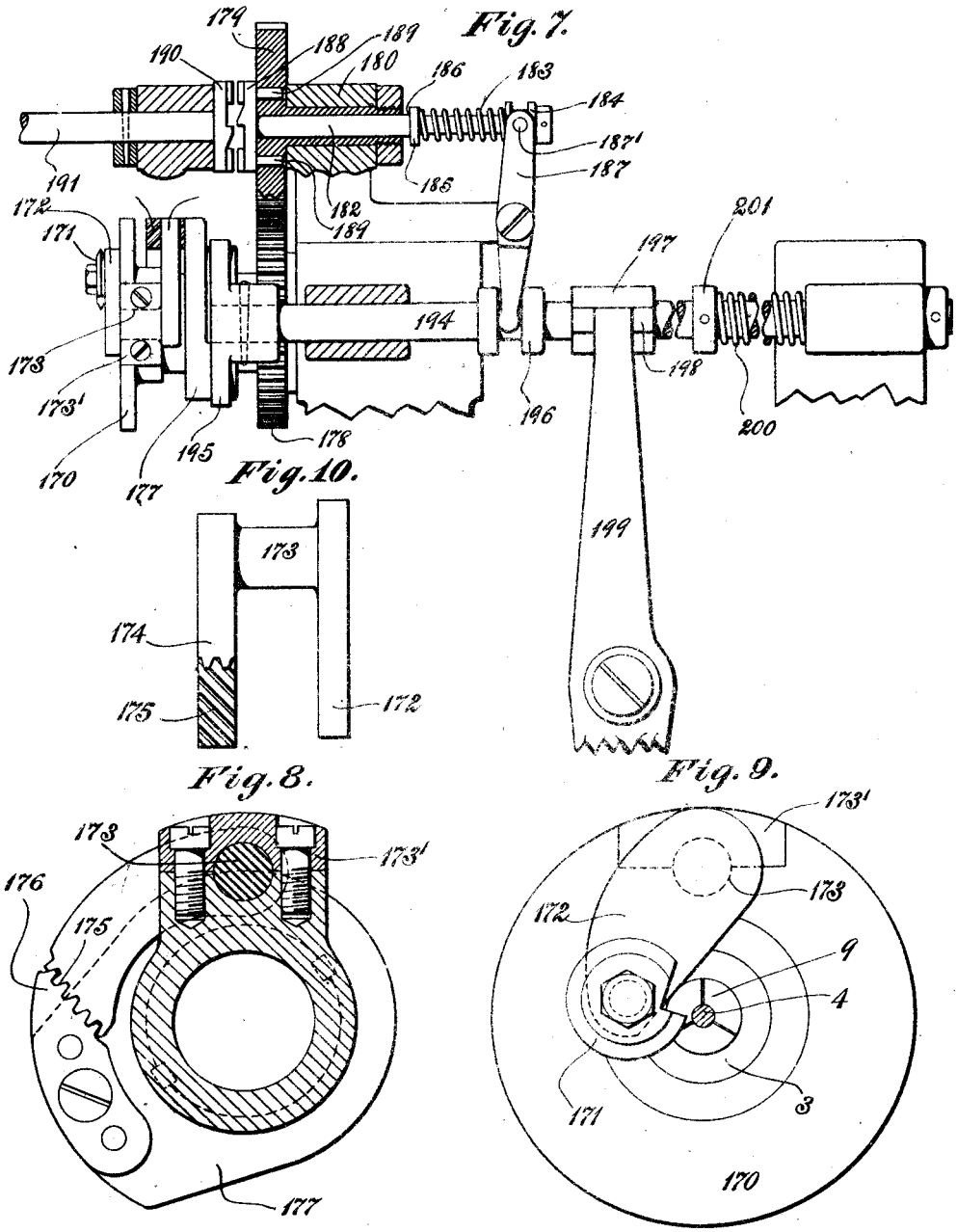

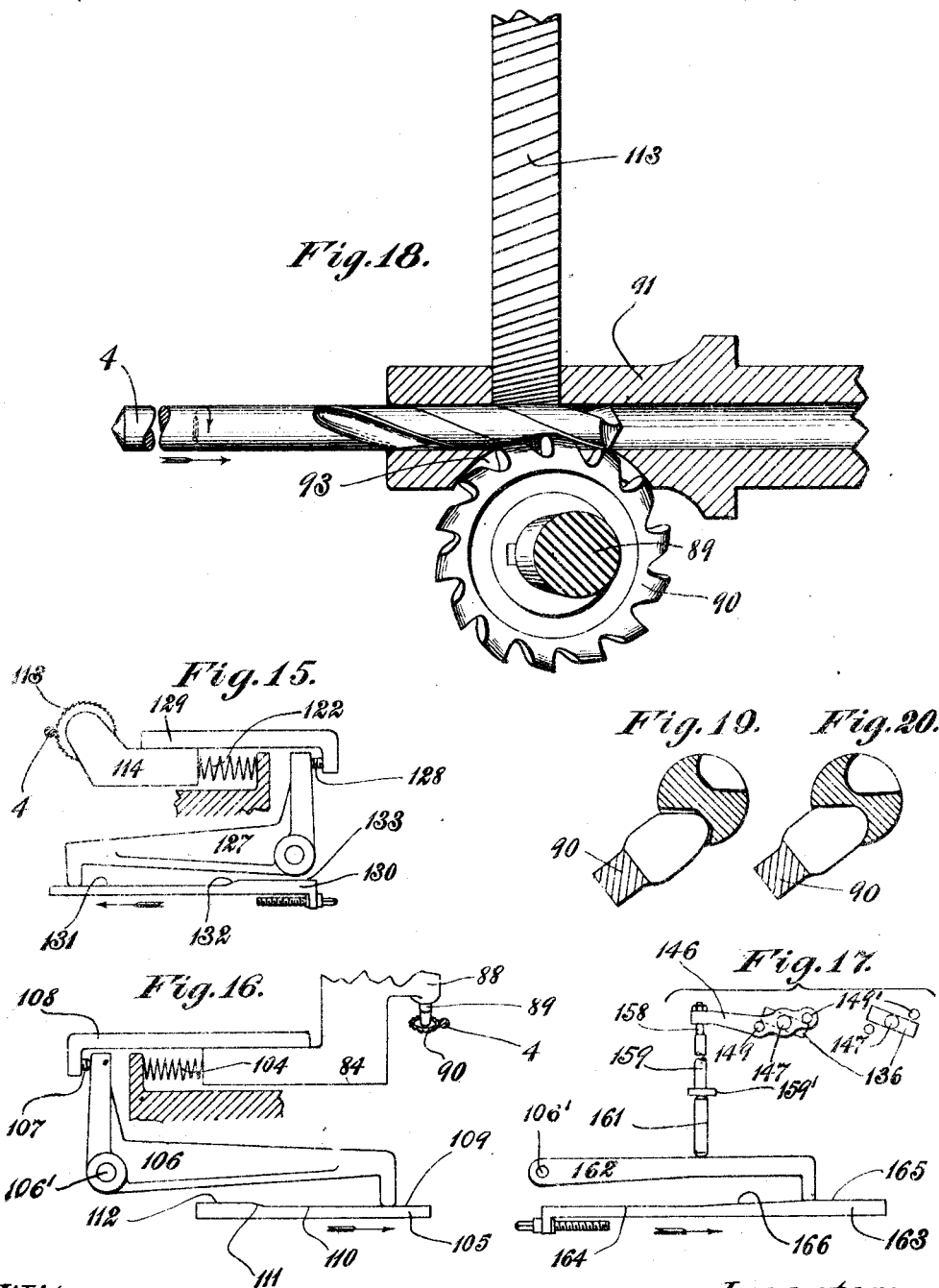

FRIEDERICH MÜLLER, OF HARTFORD, CONNECTICUT, ASSIGNOR TO PRATT & WHITNEY COMPANY, OF HARTFORD, CONNECTICUT, A CORPORATION OF NEW JERSEY.

METAL-WORKING MACHINE.

1,194,864.	Specification of Letters Patent.	Patented Aug. 15, 1916.

Application filed March 23, 1910, Serial No. 551,089. Renewed July 27, 1914. Serial No. 853,396.

*To all whom it may concern:*

Be it known that I, FRIEDERICH MÜLLER, a citizen of the United States, residing at Hartford, in the county of Hartford and State of Connecticut, have invented certain new and useful Improvements in Metal-Working Machines, of which the following is a specification.

This invention relates to machines for milling spirals; and, while as to some of its features, the invention may be employed for various purposes, it is more particularly adapted for the manufacture of twist drills.

Among the objects of the invention the following are of the first importance: to provide a machine for automatically and with a single chucking operation milling all the spiral grooves and clearances of a drill and for performing such milling operation with great accuracy and celerity; to provide such a machine for automatically advancing and chucking the stock or rod from which the drills are formed and cutting it off at the end of the milling operation, where straight shank drills are to be manufactured; to provide efficient means for varying the pitch and length of the spirals and the length of the stock fed; and to provide efficient means for gradually varying the depth of the grooves and for producing any desired width of groove irrespective of its depth and preferably without varying the shape of that portion of the groove which forms the cutting edge. These and other objects of the invention will be in part obvious and in part be more fully hereinafter set forth.

The invention consists in the novel constructions, combinations, parts, and improvements herein disclosed.

The accompanying drawings, which are referred to herein and form a part hereof, illustrate one embodiment of the invention together with a modification of one feature thereof, the same serving in connection with the description herein to explain the principles of the invention.

Figure 21:
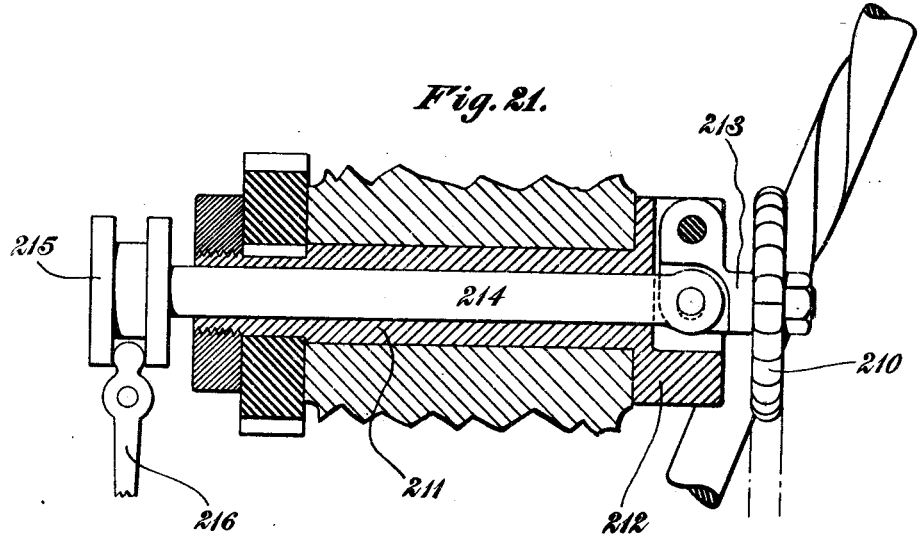
Figure 22:
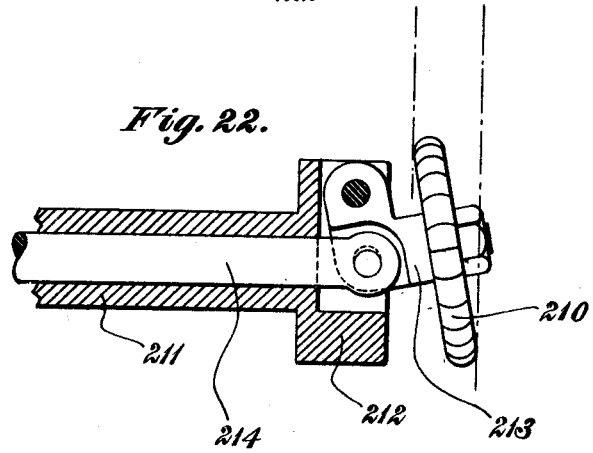

Referring to said drawings, Figure 1 is a front elevation of a twist-drill-making machine including my invention, a small portion of the same being in section; Fig. 2 is a top plan view of said machine also partially in section; Fig. 3 is a vertical, sectional view of the front end of said machine; Fig. 4 is an end elevation of the same as seen from the right in Fig. 1 and also partly in section; Fig. 4ª is a sectional detail of a cross shaft and certain associated parts hereinafter more fully described; Fig. 5 is a cross section on the line 5—5 of Fig. 2; Fig. 6 is an elevation of the milling mechanism, slides and certain coöperating parts; Fig. 7 is a sectional elevation of clutch mechanism, cutting mechanism and certain adjunctive devices hereinafter more particularly described; Fig. 8 is a sectional view of a portion of the cutting mechanism; Fig. 9 is a front elevation of the same; Fig. 10 is a detail view in side elevation of the cutter-carrier; Fig. 11 is a detail view of rack and pinion and index mechanisms, a portion of the same being broken away; Fig. 12 is a longitudinal sectional view on the line 12—12 of Fig. 11; Fig. 13 is a cross section on the line 13—13 of Fig. 11; Fig. 14 is a like view, the section being on the line 14—14 of Fig. 2. Figs. 15 to 17 inclusive are detail diagrammatic views of cam-controlling devices and certain coöperating parts hereinafter more fully described; Fig. 18 is a view of the blank being cut, the two cutters and the guide bushing for said blank; Figs. 19 and 20 are detail views of the blank and cutter for grooving the same, the blank being in section and said views illustrating the action of the grooving cutter at different points in the length of the blank; and Fig. 21 is a sectional detail of a modified mount of grooving tool, and Fig. 22 is a similar view showing how the uniformity in width of the grooves is maintained by said tool.

Like characters refer to like parts throughout the several figures.

The different parts of the machine may be supported by any suitable framework, that illustrated being denoted in a general way by 2.

In the particular embodiment illustrated the stock or blank from which the drill is formed is supported by a work carrier in the form of a spindle 3 which is hollow to provide for the passage therethrough of the stock when the latter is supplied in the form of a rod or wire 4. It will be understood that the grooving and relieving cuts are formed in the leading end of the rod, which is then cut off and the rod advanced another drill length, and chucked or clamped, these operations being repeated indefinitely. Of course, separate and previously formed drill blanks may be supplied to the machine and chucked either automatically or by hand, if desired.

The work-spindle 3 is rotatively supported by and travels with a carriage or slide 5 fitted in suitable ways in the upper portion of the bed 6 surmounting the framework 2 as best shown in Fig. 5, said slide or carriage 5 having a movement longitudinally of the machine or toward and from milling mechanism as will hereinafter appear. The spindle 3 incloses an endwise reciprocatory chuck-closing tube 7 within which is an endwise movable feed or collet operating tube 8. In the present instance the spindle 3 does not move longitudinally with respect to the slide or carriage 5 although it is rotatively mounted thereon to effect the spiral formation of the grooving and relieving cuts made in the stock carried by said spindle, as will hereinafter be pointed out.

The spindle 3 is provided with a spring-chuck 9 for clamping the work and which is operated by the chuck-closing tube 7, a collet 10 being operable by the tube 8. The two tubes 7 and 8 are reciprocated by a cam-drum 11 rotatively supported by the framework 2 and having a gear 12 meshing with a gear 13 on a main cam-shaft 14. The cam-drum 11 applies its effect to the two tubes 7 and 8 in the present case through slides 15 and 16 supported by a projection 17 on the main slide or carriage 5. The spindle 3 is provided with a sleeve 18 grooved to receive a lug 19 on the slide 15 and provided with a conical portion 20 for operating levers 21 pivoted to a fixture 22 on the spindle 3, the levers being adapted to operate a collar 23 on the outer end of the tube 7. When the slide 15 is moved toward the left in Fig. 1, the chuck 9 will be closed, and when moved toward the right, the chuck will be opened. Fastened to the tube 8 is a peripherally-grooved collar 24, the groove of which receives a lug 24' on the slide 16. The drum 11 is provided with cam strips 25, 26, 27, and 28 for effecting through the intermediate described parts the operation of the two tubes 7 and 8, the slides 16 and 15 being provided with depending rollers 29 and 30 to be engaged by said cam-strips. It will be understood that while the chuck is closed the tube 8 is moved to the left and the feed collet 10 caused to slip back on the rod, and while the chuck is open the tube 8 moves to the right, causing the collet to advance a length of rod which is predetermined by the form of the cam strips which actuate the slide 16.

In the formation of a drill the carriage 5 is given two complete reciprocations. The work is chucked at substantially the time the carriage commences the first forward stroke: a grooving cut and a relieving cut are formed during each forward stroke; the relation of the blank and cutters is shifted through half a revolution between such strokes; and where the drills are formed from a rod or wire stock, the same is cut off at the end of the second forward stroke of the carriage, the stock being then released and advanced a predetermined distance before the beginning of the next cycle. Preferably the advance of the carriage is slow, its backward movement being accelerated.

In the present instance the carriage or main slide 5 is reciprocated by a cam-drum 32 fixed on the shaft 14, the direction of rotation of which is indicated by the arrow. In the present embodiment, moreover, the mechanism for rotating the work spindle is also driven from this same cam 32 and both the longitudinal and rotary movements are derived from a single connection with the cam, this being advantageous because it avoids the necessity of giving the cam a form which must be accurately correlated to an independent train of connections. The specific character of the connections between the cam and the carriage and spindles will depend upon the pitch of the spirals to be milled, this pitch varying according to the sizes of the drills. That is to say, the smaller the drill the finer the pitch and the more rapidly will the spindle have to turn with relation to its longitudinal movement. In order to secure a sufficiently rapid rotation of the spindle to make drills of the smaller sizes, for which the present embodiment is particularly adapted, a member is provided which reciprocates in unison with but reversely to the reciprocations of the carriage and spindle. As shown, this member is in the form of a slide 33 which constitutes part of the connections between the cam and the carriage and spindle.

The upper part of the frame 2 below the bed 6 and carriage 5 is shown as having a longitudinal way to receive the slide 33 (see Figs. 3 and 5), said slide 33 being moved intermittently back and forth on the bed by the cam-drum 32 which, as will hereinafter appear, has suitable strips for this purpose. On the upper side of said slide 33 is a rack 34 in mesh with a pinion 35, the shaft of which is supported by a suitable bearing on the bed 6 and said shaft carries a second and smaller pinion 36 rigid with the pinion 35 and which meshes with a rack 37 on the under side of the carriage 5, as shown in Figs. 3 and 5. When the slide 33 is moved toward the left in Fig. 1, the carriage 5 will be moved toward the right or advanced through the intermediate rack and pinion mechanism while the latter will cause the retraction of the carriage 5, when the slide 33 is moved toward the right, and because of the difference in diameter between the two pinions 35 and 36 the amount of movement of the carriage 5 is much less than that of the slide 33. The slide 33 is shown as provided with a depending stud or antifriction roller 38 adapted to be engaged by suitable cam strips on the periphery of the drum 32 (see Figs. 1 and 5). There are four of the strips but only two of them are shown in full in Fig. 1, they being exact duplicates of other strips which will perform their office of reciprocating the carriage 5 through the intermediate parts already described. In Fig. 1 the cam-strip 39 has practically passed off the roller 38, the carriage 5 being approximately at the limit of its forward movement to which position it was moved by the strip 39 during the rotation of the drum 32 acting through said described parts. When the strip 39 passes off the roller 38, a strip like the strip 40 will engage the roller 38 to move the slide 33 to the right in Fig. 1 and thereby through the rack and pinion mechanism described, retract the carriage 5. The carriage is then advanced by a cam the counterpart of the cam 39 and when the forward movement thereof is completed, a straight strip 41 on the drum 32 comes against the roller 38 to hold the carriage in its advanced position, which is the second in one cycle of operations, during which time cutting mechanism hereinafter described comes into operation. When the finished drill has been cut from the stock 4, the cam 40 comes against the roller 38 to draw the carriage 5 back, and at this time the chuck 9 has been opened, the tube 7 being drawn back at the conclusion of the cutting operation. Following this operation a fresh supply of stock is pushed through the opened chuck by the cam 26 on the drum 11 riding against the roller 29 and thereby moving the auxiliary slide 16 forward.

The machine is driven by a shaft 42 mounted in suitable bearings located beyond the forward end of the carriage 5, and this shaft is provided at one end with a pulley 43 adapted to receive a belt 44, as shown by dotted lines in Fig. 1. Fixed to the shaft 41 is a peripherally grooved pulley 45 connected by a band 46 with a pulley 47 loose on the shaft 48 supported by suitable bearing brackets fixed at the lower forward side of the frame 2, said belt being shown by dotted lines in Fig. 1. Fastened to the shaft 48 is a worm 49 in mesh with the worm-gear 50 fixed on the forward end of the shaft 14. In connection with the shaft 48 are provided suitable speed-changing mechanism and a clutch 51 (Fig. 2) by means of which the fast and slow factors of the speed-changing mechanism can be alternately clutched to the shaft 48 to drive the drum 32 at successive slow and fast speeds. On said shaft 14 is fastened a wheel 54 having peripheral tappets or cams 55 for operating the clutch-shifting lever 56 to change speeds at proper points in the operation of the machine. The points of change are preferably so selected that the carriage 5 is advanced at a slow speed during the milling operation and drawn back at a quick speed.

While I prefer to advance the carriage 5 and thereby the stock as distinguished from the milling tool during the milling operation, and while I prefer to also turn the stock or work spindle to form in the stock the spiral grooves by which the drill is made, these are not essential. I will now, however, describe a simple and advantageous means by which the spindle 3 can be turned by connections with the slide 33 and also how I can vary the speed of rotation of said spindle to thereby vary the pitch of the grooves.

The slide 33 has an upstanding portion 57 upon which is mounted a rack 58 which although normally immovable with respect to said slide, is laterally adjustable thereof for a purpose that will hereinafter appear. A pinion 59 meshes with the teeth of said rack and is loosely carried by the lower end of a shaft 60 extending through and turning in a vertical bore in the carriage 5. A bevel gear 61 is fastened to the upper end of the shaft 60 and meshes with a bevel gear 62 carried by and adapted to transfer through suitable means, hereinafter described, its effect to the spindle 3 for turning the same. The pinion 59 is shown (Fig. 11) as having an arcuate slot 63 to receive the pin or stud on the disk 64 rigid with the said shaft 60, said slot being concentric with the axis of motion of said shaft and it and the pin 64 permitting a certain amount of relative or lost motion between said pinion 59 and shaft 60 for a purpose which will appear presently.

The bevel gear 62 is loose on the spindle 3 and its hub is provided with a laterally projecting casing or shell 65 rigid therewith and in this shell or casing is pivoted a pawl 66 normally held in operative position by a leaf spring 67 to engage two diametrically opposed shoulders 69 and 70 on the periphery of an index plate or disk 68 fastened to the spindle 3 as shown best in Figs. 3 and 13. As the rack 58 moves toward the rear and the carriage 5 moves forward during a milling operation, the bevel gear 62 and its casing 65 are moved in the direction of the curved arrow (Fig. 11) and the pawl 66 engages one of the shoulders of the ratchet member 68 and turns the spindle 3 and the stock carried thereby, the cutters being thus caused to operate along spiral lines on the stock. When the first milling operation on the leading end of the stock has been completed, the cutters are moved away from the stock as hereinafter explained and the carriage 5 is moved backward carrying the stock with it to begin the second milling operation. During this action the pinion 59 is moved backward and after the lost motion due to the slot 63 has been taken up the bevel gears 61 and 62 are also moved backward but the spindle 3 does not partake of this movement because the pawl 66 is not effective to rotate the disk 68 in the backward direction. In order that the stock shall be turned through an angle of 180° or "indexed" so that the spirals formed by the second milling operation shall be on the opposite side of the stock from those formed by the first milling operation, the parts are so proportioned that when the carriage begins its second forward motion the pawl 66 will engage the shoulder of the index disk opposite that engaged by the pawl during the first milling operation. This proportioning of the parts is facilitated by the provision of the slot 63 which may readily be made longer or shorter, thereby varying the lost motion and the extent of rotation of the gear 62 and its pawl 66 for a given length of stroke of the carriage 5 and slide 33.

Suitable means may be provided to prevent accidental backward rotation of the spindle 3 during the backward movement of the carriage 5, and thereby insure the proper operation of the indexing mechanism. As shown, one of the bearings for the spindle 3 is recessed or chambered to receive the substantially segmental shoe 71 which has in its under side a groove or channel 72 eccentrically disposed to receive a roller 72 as shown best in Fig. 14. By reason of this construction the spindle can always freely turn in a forward direction while any backward movement thereof is at once prevented by the roller 67 which tends to roll into the shallow portion of the groove 72.

Suitable means are provided for varying the pitch of the spirals formed by the milling operations. In the present case the gear 59 is a "change gear" and the coöperating rack 58 is made laterally shiftable to properly mesh with gears of different diameters. To this end the rack has one or more transversely elongated slots 74 for the passage of clamping screws 75 tapped into the slide 33 as shown best in Figs. 5, 11, and 12. By loosening these screws the rack can be moved sidewise and the gear 59 dismounted and one of a different diameter put in its stead after which the rack will be put into proper mesh with the gear and fixed in this position by setting up the clamping screws 75. Means are preferably provided for maintaining the rack 58 in parallelism at all times with the path of movement of the carriage 5. As shown, a plate 76 slides longitudinally under the rack and is provided with longitudinal slots 76' which engage the screws 75 one of which is shown in Fig. 12. This plate is also provided with means which on the endwise movement thereof produce sidewise movement of the rack. This means comprises in the present instance a pair of keys fitted in oblique grooves formed near the opposite ends of the rack 58 and plate 76, one of these keys being illustrated in Figs. 11 and 12 and then numbered 77. It follows that when the plate 76 is moved longitudinally the rack 58 will be moved laterally. To facilitate the movement of the plate 76 it has a pendent lug 78 at its rear end through which is passed a screw 79 tapped into the slide 33 to move the plate in one direction, a second screw 80 being tapped through the lug 78 and bearing against the slide 33 to move the plate 76 in the opposite direction. The plate is moved by loosening one screw and turning the other, and the plate is held by tightening the screws.

As far as certain features of the invention are concerned, any suitable form of milling mechanism may be used. In accordance with other features of the invention, the milling mechanism comprises a groove-milling tool and a relief-milling tool and means for controlling the operations of these tools whereby they operate simultaneously on opposite sides of the blank, the cut or spiral formed by each tool during the first milling operation of a cycle being joined with the spiral formed by the other tool during the second milling operation, thereby producing during each cycle and with a single passing of the blank a completely grooved and relieved drill. In accordance with certain features of the invention, also, the cutters are automatically moved away from the stock at the end of each milling operation to permit of the retraction of the stock at the end of the first milling operation and the discharge of the completely milled drill at the end of the second milling operation, and the cutters are automatically returned to their exact operative positions prior to the beginning of each milling operation, preferably to still other features of the invention, the groove milling cutter is formed to produce grooves which are successively lower from the point toward the shank of the drill and which, nevertheless, may have a substantially uniform width and may have a variable contour particularly as regards the side thereof which forms the cutting edge.

The groove-milling mechanism is best shown in Fig. 4. See also Figs. 1, 2, and 3. Upon the forward end of the frame 2 is rigidly fastened a supporting plate 81, the frame being grooved to receive a depending tongue or rib 82 on the plate, the latter being thereby clamped to the frame at its sides by clips 83. This plate presents a suitable support for the grooving tool carrier or slide 84 which has a reciprocation transversely of the bed 2, this motion of the slide being produced to obtain the progressive shallowing of the spiral grooves, and the separation of the tool from the stock at the end of the milling operation. The cross slide 84 has a dovetail groove in its under side to receive a correspondingly shaped tongue 85 on the plate 81 to accurately guide the slide. The cross slide 84 is provided with an upright or standard 86 which is shown as having a groove to slidingly receive a tongue 87 on a slide 88, said tongue and groove being disposed at an angle to the vertical. This angle is preferably so determined as to provide the most advantageous inclination of the grooves with reference to the axis of the drills, and, being once determined, may remain constant for all sizes of drills.

The slide or head 88 is bored to receive the rotary spindle 89 which, as will be observed, is at the same angle as the said slide 88 and its guide tongue 87 and by virtue of this angular relation the tool 90 fastened to the lower end of said spindle or shaft 89 will be presented at the proper angle to the work. The cutting tool 90 is the ordinary peripherally toothed milling tool which is commonly used for milling grooves and owing to its disposition relatively to the stock or work and the rotation of the latter, spiral grooves are formed in said work during the relative movement of the stock and the said milling tool. The leading or advance end of the stock 4 forward of the chuck 9 is projected into a bushing or supporting tube 91 supported by a bracket 92 fastened to the plate 81 in front of the carriage 5, said bushing or tube 91 having an oblique slot 93 to receive the milling tool as shown in Fig. 18. The cutter spindle or shaft 89 is preferably held against endwise movement with relation to the slide 88, being to this end provided with stop collars 94 so that when the slide 88 is vibrated the said spindle is also vibrated. In the present case the said cutter spindle 89 is continuously driven from the shaft 42 by the following connections: Splined on the shaft 42 (see Fig. 4ª) is a sleeve 42′ to which is fixed a spiral gear 95 in mesh with a spiral gear 96 fastened to a stud-shaft 97 supported by a suitable bearing on the upright or standard 86, said upright also having a bearing to support the sleeve 42′. The shaft 97 has a pinion 98 fastened to its upper end, which is in mesh with a spur gear 99 fastened to the upper end of the cutter spindle 89 with which said stud-shaft 97 is in parallelism, the depth of the two gears 98 and 99 being sufficient always to maintain a proper or sufficient mesh between the teeth thereof during the vibration of the slide 88 to insure a proper driving connection therebetween.

In the present case spring means are provided for exerting a constant tendency to move the slide 84 inward, independent means being provided for moving said slide outward. Below the slide 84 is a rod 100 (Fig. 4), said slide having a depending lug 101 to freely receive one end of the rod, the other end thereof having a head or disk 102 in which the tip of a screw 103 fits, said screw being tapped through a lug on the plate 81. Said rod 100 is encircled by a push spring 104 the ends of which bear against the head 102 and lug 101 respectively by virtue of which said spring tends constantly to thrust the said slide 84 inward. Normally, or prior to the beginning of the milling operation, this slide 84 is at the inner limit of its movement, so that when the extreme forward end of the stock 4 is projected into the bushing 91 the tool 90 will commence to mill a groove of full depth in the leading portion of the stock, the latter being moved forward and at the same time turned as already indicated to form a longitudinally disposed spiral groove in the stock. As the milling operation proceeds, the slide 84 will be slowly fed outward so that the groove will be made progressively shallower and the means for securing this function is controlled by the slide 33 which, as will be remembered, moves oppositely to the carriage 5.

As shown in Figs. 3 and 4 and diagrammatically in Fig. 16, the slide 33 is provided upon its forward portion with a cam bar 105 which coöperates with a lever 106 pivoted at 106′ to the framework of the machine, the short arm of said lever being adapted to engage a screw 107 tapped through the downturned portion of the slide 84. Owing to the fact that the screw 107 is adjustable, it forms a means for varying the position of said slide 84 with respect to the lever 106 to regulate the initial depth of the groove. The long arm of the lever bears at all times during the milling operation against the upper surface of the cam bar 105, said upper surface having several distinct portions 109, 110, 111, and 112. The initial portion 109 being flat does not impart any movement to the lever 106 and slide 84 as the slide starts to move forward, but simply holds the parts against the force of the spring 104 and in position for the cutter 90 to start its grooving cut. As the slide 33 moves backward upon the forward movement of the main-slide 5, the face 110 which is made upon an upward and rearward taper will by engaging the lever swing the long arm thereof upward and the short arm thereof outward to thereby move the slide 84 outward and hence cause a progressive shallowing or tapering of the groove being milled. At the conclusion of the milling operation the steep angular face 111 comes into contact with said long arm and quickly raises the same whereby the milling tool 90 through the intermediate parts is moved rapidly wholly out of contact with the stock 4, where it is held during the remainder of the forward movement of the carriage by the flat face 112. During the return movement of the carriage 5 or the forward movement of the slide 33, the tool 90 is retained in its retracted position by a latch 84' which is moved by a spring 84'' into position to retain the long arm of the lever 106 in its elevated position, when the latter is lifted by the steep face 111 of the cam bar 105. The latch 84' is actuated near the end of the return stroke of the carriage 5 to release the lever 106 and permit the tool 90 to resume its operative position, as will be presently explained.

In addition to the groove-milling tool 90 there is a second milling tool which serves to cut away a portion of the surface of the stock between the grooves therein so as to leave a shoulder or ridge adjacent that side wall of each groove which forms the cutting edge of the drill. A milling tool adapted to make these clearance or backing off cuts is shown at 113 and it is rotatively mounted upon a carrier or slide 114 supported and guided by the plate 81. The said backing off or relieving tool 113 is carried by a shaft 115 supported in parallel relation with the stock or blank-carrying spindle 3 by suitable bearings on the second cross slide 114. In the present case the tool 113 is operatively connected with the shaft 42 by means of suitable gearing, as follows: Fastened to the shaft 115 is a pinion 116 in mesh with a gear 117 rotatively supported by the slide 114 and which in turn meshes with a pinion 118 fastened to a shaft 119 also supported by the slide 114. The shaft 119 carries a spiral gear 120 in mesh with a spiral gear 121 fastened to the shaft 42. The tool 113 operates through a slot in the bushing 91 opposite that through which the tool 90 operates. When the tool 90 commences to groove the blank, the tool 113 also commences its work and both cross slides 84 and 114 are at the inward limits of their movements for a given adjustment. The slide 114, like the slide 84, is provided with a spring which constantly tends to move the slide inward.

As shown, a spring 122 is coiled around a rod 123 passing freely at its inner end through a depending lug 124 on said slide 114, the opposite end of said rod having a head 125 to receive a screw 126 tapped through a lug projecting upward from the plate 86 practically in the same manner as shown and previously described in connection with the slide 84. As a suitable means for moving the slide 114 outward in opposition to the spring 122, a lever 127 is utilized, said lever being pivoted to the framework, and having a short arm adapted to engage a screw 128 tapped through the depending portion of a bracket 129 fastened to the slide 114, as shown in Fig. 4. Coöperative with a long arm of the lever 127 is a cam bar 130 carried by the forward extension of the slide 33. As diagrammatically illustrated in Fig. 15, the upper surface of said cam bar 130 is divided into three portions, a flat portion 131, a steep angular portion 132 and a second flat portion 133. The portions 131, 132, and 133 are adapted successively to engage the long arm of the lever 127 during the forward or milling stroke of the carriage 5. The long arm of the lever remains in contact with flat portion 131 until the desired length of backing-off spiral is formed. Then the angular portion operates to quickly move the backing-off tool 113 out of operation, where it is held by the flat portion 133 while the carriage completes its forward stroke. It will be understood from an inspection of Fig. 15 that the backing-off tool 113 should be moved out of operation prior to the time that the grooving tool 90 is moved out of operation, the interval being of sufficient duration to permit the stock to make substantially one-half of a revolution. As the interval will vary according to the size of the drill, means are preferably provided for varying the relation between the periods at which the grooving and backing-off tools are thrown out of operation. In the present instance this is effected by making one of the cam bars 105 and 130 longitudinally movable with relation to the other. As shown, the bar 130 is mounted to shift endwise on the slide 33, its movement being effected and its position maintained by a screw 130' which engages a depending portion of the bar and is tapped into the end of the slide.

The backing off tool is retained in its retracted position during the return stroke of the carriage 5 by the latch 84' which is moved into position to retain the long arm of the lever 127 in its elevated position, when the long arm of the lever 106 is elevated to throw out the cutter 90 as previously explained. The latch which is thus conveniently utilized to hold both milling tools out of operation during the return strokes of the carriage 5 is actuated to release the tools and allow them to be retracted to their operative positions by a trip device 114' so located on the slide 33 that it will push the latch out of engagement of the levers 106 and 127 as the carriage 5 approaches the limit of its return stroke.

It will be evident from an inspection of Figs. 19 and 20 that the gradual withdrawal of the grooving tool 90 would have the effect of reducing the width of the grooves as well as the depth unless some means were provided to prevent such reduction in width which would be undesirable in that it would so reduce the area of the passages formed by the grooves when the drill is well advanced in a piece of work as to give such passages a tendency to become choked by the chips.

In accordance with one feature of the invention, this reduction in the width of the grooves is prevented by imparting a vibrating motion to the grooving cutter, the amplitude of the vibrations being gradually increased as the cutter is gradually withdrawn from the stock to reduce the depth of the groove. In the present instance the cutter is vibrated in the axial direction.

As shown, the slide 88 in which the cutter shaft is mounted is vibrated in the longitudinal direction and the extent of this vibration is gradually varied. This is accomplished as follows: The standard or upright 86 has a slot 135 through which is passed a block 136 rigidly connected in some suitable manner as by one or more screws 137 with the slide 88 as shown best in Fig. 4, and it will be evident that when said block is raised and lowered, the grooving tool carrier or slide 88 will be vibrated to effect the result already stated. The block 136 is perforated to receive the rod 138 (Figs. 4 and 6) which is enlarged at 139 to form a sliding fit in said perforation, while collars 140 and 141 loosely surround said rod and bear against the shoulders produced by said enlargement 139. The rod above and below the block is encircled by coiled springs 142 and 143, the inner ends of which bear against the collars 140 and 141, while the outer ends of said springs bear against collars 144 and 145 which may consist of nuts threaded onto the rod 138. The rod is moved endwise by suitable mechanism to impart yieldingly through the two springs the necessary vibratory movement to the milling or grooving tool 90 through the aid of the coöperating parts. Prior to the point where the grooves are tapered the block 136 is held or locked against motion and although at this time the rod 138 is moved endwise, the said block is not affected owing to the presence of the springs which are however alternately compressed and relaxed. Means are brought into play automatically at the time the grooves are being made for releasing and thereby permitting movement of said block, said means being of such character that the range of movement of the block is gradually increased and in conformity with the progressive shallowing of the groove being milled, the vibration being very slight at the commencing of the grooving operation as will now appear.

A lever 146 (see Fig. 6) is pivoted between its ends as at 147 to a bearing 148 (see Fig. 4) on the standard or upright 86 and said lever is provided at opposite sides of its pivot with pins 149 and 149′ which respectively fit into rabbets 150 and 151 in the lower and upper edges of the block 136, as shown best in Fig. 6, said pins acting as stop or limit pins for the block. When the pins occupy the position shown in Fig. 6, they positively lock the block against any movement notwithstanding the fact, as already intimated, that the rod 138 is being endwise reciprocated. Means are provided for normally holding the long arm of the lever 146 in the position shown in said Fig. 6 and when said means is lowered, it will be evident that the pin 149 is also lowered and that the pin 149′ is raised, thereby permitting movement of the block 136 in proportion to the amount of movement of the controlling or stop lever and a like amount of vibratory movement of the milling tool 90. The means whereby the operation of the lever 146 is governed will be presently described.

A lever 152 is fulcrumed between its ends to the standard or upright 86, as best shown in Fig. 6, the inner arm of said lever being pivotally connected as at 152′ to a collar 153 fastened to the lower end of the rod 136. The outer or longer arm of said lever 152 is equipped with a stud 154 which fits a cam groove 155 in the spur gear 156, the shaft of which is supported by a suitable bearing on the standard or upright 86, as best shown in Fig. 4, said spur gear being in mesh with a pinion 157 rotative with the shaft 42, so that the lever 152 through the described means is constantly oscillated.

The tail portion of the lever 146 has tapped therethrough a screw 158 the tip portion of which bears against a rod 159 supported for vertical movement by a guide member 160 on the upright or standard 86, said rod having a foot 159′ which rests on the pin or stud 161 guided for vertical movement in a suitable bore in the framework. The lower end of said pin rests on the lever 162 which is supported at its outer end for rocking motion by the pivot 106′ for the lever 106 previously described. The construction last described is shown also diagrammatically in Fig. 17. The means for governing the lever 162 is connected with the slide 33 for which purpose said slide is shown provided upon its forward extension with a third cam bar 163. This cam bar is provided with flat portions 164 and 165 and an intermediate gradually inclined portion 166, as shown best in Fig. 17. When the slide 33 is in its forward position, the carriage 5 will be in its backward position, and when the grooving and relieving operations are to take place the said slide 33 is moved backward, carrying with it the cam 163. At the commencement of the operation the lever 162 will be upon the flat portion 165, and when said slide 33 has moved backward a predetermined distance, the inclined face 166 will reach the lever 162 and permit it to gradually fall as the operation proceeds. This will permit a gradual increase in the vibration of the grooving tool 90. In practice the inclined face will be so positioned that the entering or highest end thereof will come in contact with the free end of the lever 162 at or approximately at the time that the groove in the stock is to be shallowed and the vibration of the tool will be gradually increased as the main slide or carriage 5 moves forward and until such time as the free end of the lever encounters the flat portion 164 at which point the grooving tool, although still being vibrated, is thrown wholly out of engagement with the work. When the slide 33 is moved forward the lever 162, pin 161, rod 159 and lever 146 are returned to their normal positions at which point vibration of the slide 88 is stopped. In order that the degree of vibration may be varied with relation to the grooving operation, the cam bar 163 is preferably shiftable longitudinally of the slide, as by means of a screw 163' similar to the screw 130' previously described in connection with the cam bar 130.

After the diametrically opposite grooves have been formed in the leading end of the stock and after the said stock has been relieved between the grooves in the manner already described, two complete reciprocations of the main slide or carriage 5 being necessary for this, the stock is cut off comparatively close to the chuck, this action occurring practically at the time that the main slide 5 is in its forward position, the piece of stock thus cut off constituting a completely milled drill, which is left temporarily in the bushing or tube 91, and then thrust forward therefrom and out of the same when the leading end of the stock is advanced. It will be understood that during the cutting off operation the strip 41 of the rotating drum 32 is against the stud or anti-friction roller 38 so as to hold the carriage or slide 5, through the intermediate parts, solidly and firmly in its forward position.

The means illustrated for cutting off the grooved and relieved portion of the stock will now be described.

The hub of a disk 170 is shown (see Fig. 3) as loosely carried by the spindle 3 at the front end thereof and the cutting off tool in the present case is supported by this plate or disk, the same being denoted by 171 and being suitably clamped to an arm 172 rigid with a shaft 173 supported for rocking motion by a suitable bearing or boxing 173' upon the periphery of the disk 170 as best shown in Figs. 8 and 9. The arm 172 is adapted to swing as will be clear and the knife or cutter 171 thereof is shown in its retracted position in Fig. 9. When the stock is to be cut, the arm is swung inward and at the same time the plate or disk 170 is rotated, the compound action causing the knife or cutter to sever the stock and the instant that the severing operation is completed all the parts of the cutting mechanism are immediately returned to their respective positions. There is shown rigidly connected with the rock-shaft 173 an arm 174 (Fig. 10) which terminates in or is provided with a segmental work or spirally toothed portion 175 which meshes with a worm segment or gear member 176 rigidly fastened to the collar 177 splined on the hub of the disk 170 (Fig. 3). When said sleeve 177 is moved backward or toward the left in Fig. 3 the cutter-carrying arm 172 will be swung inward and being also revolved at this time, it will cut off the grooved and relieved portion of the stock. When the said sleeve 177 is slid forward the arm 172 through the described connections, will be swung backward into the position shown in Fig. 9.

Loose on the spindle 3 is a spur gear 178 which is rigidly connected with the elongated hub of the disk 170 and this spur-gear is in mesh with a second spur-gear 179 which is intermittently rotated as will hereinafter appear. The elongated hub of the spur-gear 179 is loosely supported in a bearing 180 on the main slide or carriage 5 and through said hub is shown passed a push rod 182 (Figs. 3 and 7) encircled by a coiled spring 183 one end of which bears against the peripherally grooved collar 184 and the other end of which bears against a collar 185. Both the collars are carried by said rod and while each is loose thereon the collar 185 acts against a shoulder 186 on said rod. The lever 187 is supported for swinging movement between its ends on the carriage 5 its upper end being equipped with pins 187' which enter the peripheral groove of the collar 184. The forward end of the push rod 182 is equipped with a clutch head 188 provided on its rear or inner face with dowel pins 189 (see Fig. 7) fitting bores or perforations in the spur-gear 179 which provides a suitable rotatable connection between said clutch head or member 188 and the gear 179. When therefore, said clutch member is connected with a complemental and continuously driven clutch member such as that denoted by 190 the spur-gear 179 will be rotated so as to secure the rotation, through the described parts, of the disk or plate 170 and therefore the revolution of the cutter-carrier 172. The clutch-member 190 is fastened to a shaft 191 which is shown as provided with a spiral gear 192 (Fig. 3) in mesh with the spiral gear 193 on the shaft 42 which it will be remembered is continuously rotated, the said spiral gears being suitably fastened to the respective shafts. At the proper point in the operation of the machine as will hereinafter more particularly appear, the upper arm of the lever 184 is swung forward and it serves through the described parts to put the clutch member 188 into working relation with the clutch member 190 to secure the function stated, the spring 183 serving as a convenient means for yieldingly transferring the effect of said lever to said clutch member 188.

On the slide or carriage 5 and guided for endwise movement in a suitable bearing thereon, is a thrust rod 194 in parallelism with the rod 182 and at the forward end of said rod is fastened the hub of a forked shifting member 195 the branches of which enter a peripheral groove in the sleeve 177, said thrust rod 194 being moved backward at the proper point in the operation of the machine to cause through the parts already described the inward swinging of the carrier 172 and at the same time, through means now to be described, the like movement of the upper branch of the lever 187 and thereby through the operation of said lever an engagement between the clutch members 188 and 190. The lower branch of said lever 187 enters a groove or channel in the collar 196 fastened to the rod 194.

Fastened to the thrust rod 194 is a collar 197 provided with a lateral projection or arm 198 coöperative with the lever 199 pivotally supported between its ends on the framework, the function of said lever 199 being to act against said arm 198 and thereby draw the rod 194 backward and in opposition to spring means as a spring 200 which is shown encircling the outer portion of said rod and which bears against a collar 201 thereon and also against one of the bearings for said rod 194. Normally said spring is not under tension or lax as shown in Fig. 7. When, however, the lever 199 is operated to swing the upper arm thereof to the right in said figure the rod 194 is moved in a like direction while the rod 182 through the lever 184 and coöperating means is thrust forward or toward the left in said figure so as to throw the two active means of the cutting mechanism simultaneously into operation. When the lever 199 is freed, as will hereinafter appear, the spring 200 by acting against the collar 201 will move the rod 194 forward and, through the described parts, the rod 182 backward to throw the different devices of the cutting mechanism out of action or to return the same to their primary and ineffective positions.

The drum 32 which I have already described is shown provided with a cam 202 the active portion of which just about the time the carriage or main slide 5 has completed its second forward stroke (the second grooving and second relieving operation having taken place at this time) comes against a stud 203 at the lower end of the lever 199 to thereby swing the upper branch of the said lever to the right in Fig. 7 and to the left in Fig. 1 for throwing the different parts of the cutting off mechanism into action to sever the grooved and relieved portion at the leading end of the stock.

In operation, the stock 4 is fed forward a distance corresponding to the length of the drill to be made and through the opened chuck 9 following which said chuck is closed all as already described. The main slide or carriage 5 is assumed to be in its backward position by the time the work is chucked and as said carriage moves the milling or grooving cutter 90 commences to groove the material. During such forward movement the relieving cutter or tool 113 is also in operation and when the carriage has completed its forward stroke, these two cutters are simultaneously moved away from the work and are held in their outer positions during the retractive movement of said carriage and until the same has completed its backward stroke at which time the grooving and relieving operations are repeated. At the conclusion of the second grooving and milling operation the stock is cut off as already described. The foregoing is a general description, it being understood that at a predetermined time in the grooving operation the milling tool 90 is fed outward and vibrated as already described.

In Figs. 21 and 22 is represented a modified form of mount for the grooving tool. In this construction the tool 210 is gradually withdrawn, but instead of being given a bodily vibratory movement as in the case of the grooving tool already described, its peripheral portion is vibrated or moved from side to side of the groove and this I secure by providing for a wabbling motion of said tool 210, the amount of wabble progressively increasing so as to control the width of the grooves. The numeral 211 denotes a power-operated shaft having a head 212 to which the outer terminal portion of a substantially L-shaped cutter carrier 213 is pivoted, the rod 214 being pivoted to said cutter-carrier at its angle, said rod being slidable in the said shaft 211 which it will be observed is hollow. The cutter carrier 213 acts as a suitable key between the rod and shaft so that they will be rotatively connected. The rod 214 is equipped at its outer end with a peripherally grooved collar 215, the groove of which receives the lever 216 by which the rod 214 may be moved endwise. The movement of this rod in a forward direction during the grooving operation is gradual so that the amount of wabble of the milling tool or cutter 210 is progressively increased whereby the function desired can be secured.

The invention in its broader aspects is not limited to the particular construction shown, nor to any particular construction by which it has been or may be carried into effect, as many changes may be made in the construction without departing from the main principles of the invention and without sacrificing its chief advantages.

What I claim is:

1. A machine for milling twist drills and the like, including in combination, a grooving tool, a backing-off tool, means for giving the blank a plurality of successive longitudinal and rotary movements with relation to the tools to form a plurality of grooves and backed-off portions on the blank, means for retracting the blank and changing its initial relation to the tools between successive milling operations.

2. A machine for milling twist drills and the like, including in combination, a grooving tool, a backing off tool, means for giving the blank a plurality of successive longitudinal and rotary movements with relation to the tools to form a plurality of grooves and backed-off portions on the blank, means for retracting the blank and changing its initial relation to the tools between successive milling operations, and means rendered operative after a plurality of successive milling operations for automatically presenting a succession of blanks to the milling tools.

3. A machine for milling twist drills and the like including in combination, a grooving tool, a backing off tool, means for giving the blank a plurality of successive longitudinal and rotary movements with relation to the tools to form a plurality of grooves and backed-off portions on the blank, means for retracting the blank and changing its initial relation to the tools between successive milling operations, means rendered operative after a plurality of successive milling operations for automatically feeding a predetermined length of stock to the milling tools, and means for cutting off the stock after a plurality of grooves have been formed therein.

4. A machine for milling twist drills and the like including in combination, a grooving tool, a backing off tool, means for simultaneously advancing and rotating a blank with relation to said tool to form a spiral groove on one side of the blank and a spiral backed-off portion on the opposite side thereof, means for moving the tools out of operative position when predetermined lengths of the spirals have been formed, means for retracting the blank, means for indexing the blank, means for again advancing the blank to present the opposite side thereof to the respective milling tools whereby a second spiral groove and backed-off portion are formed, means for cutting off a predetermined length of the blank after the second milling operation is completed, and means for forwarding a predetermined length of stock to form a succeeding blank.

5. A machine for milling twist drills and the like, including in combination, a grooving tool, a backing-off tool, means including a chuck for supporting a drill blank in the machine, means for effecting a relative longitudinal rotary movement between the blank and the said tools to form a spiral groove and backed-off portion on the blank, means for moving the tools out of operative relation to the blank after predetermined lengths of the spirals have been formed, means for retracting the blank, means for indexing the blank, means for effecting a second relative longitudinal and rotary movement between the blank and the milling tools to produce a second set of spirals upon the blank, whereby with a single chucking operation all the spiral grooves and clearances of a drill may be formed.

6. A machine for milling twist drills and the like including in combination, a work-carrier, a groove milling tool, and mechanism for relatively moving the work to the tool to cause the tool to spirally groove the work, means for relatively moving the work and tool to vary the depth of the groove, means for relatively moving the work and the tool to control the width of the groove, a backing-off tool, and means for moving both tools out of operation at predetermined points.

7. A machine for milling twist drills and the like including in combination, a blank supporting member, a cutter supporting member, a carriage in which one of said members is mounted, means mounted on said carriage for rotating the said blank supporting member, a slide, means for causing said carriage and slide to move in opposite directions, and means on said slide for driving said rotating means.

8. A machine for milling twist drills and the like including in combination, a carriage, a slide, means for reciprocating the slide, mechanism between the slide and carriage for reciprocating the latter in a direction opposite to that of the slide, a work-carrying spindle mounted on the carriage, a milling tool, and means connected with the slide for rotating the spindle.

9. A machine for milling twist drills and the like including in combination, a carriage, a slide, a rack connected with the slide, a rack connected with the carriage, a pair of pinions of different diameters in mesh with the respective racks, means for reciprocating the slide, a spindle on the carriage, and means connected with the slide for rotating said spindle.

10. A machine for milling twist drills and the like, including in combination, a pair of slides, means for operating the slides with different degrees of movement, a work-carrier on one of the slides, and means operable by the other slide for rotating said work-carrier.

11. A machine for milling twist drills and the like including in combination, a pair of slides, means for operating said slides with different degrees of movement, a spindle carried by the slide having the less degree of movement, and a gearing operable by the slide having the greater degree of movement for turning said spindle.

12. A machine for milling twist drills and the like including in combination, a pair of slides, means for operating one of said slides, mechanism interposed between the slides for causing a movement of one of them, which is of less extent than that of the other, a work-carrying spindle supported by the slide having the less degree of movement, and means driven from the other slide for turning said spindle.

13. A machine for milling twist drills and the like including in combination, a slide, means for reciprocating said slide, a laterally adjustable rack carried by said slide, a carriage, a work-carrying spindle mounted on said carriage, a pinion removably supported by the carriage in position to mesh with said rack, and means for transferring the motion of said pinion to said spindle.

14. A machine for milling twist drills and the like including in combination, a reciprocatory carriage provided with a rotary work-carrying spindle, a groove milling tool, a rack, a pinion in mesh with said rack, lost motion mechanism operated by said pinion, and means including an index device for transferring the effect of the lost motion mechanism to the spindle.

15. A machine for milling twist drills and the like including in combination, a reciprocatory carriage provided with a rotary work-carrying spindle, a milling tool, a rack, a pinion in mesh with said rack having an elongated slot, a shaft provided with a disk having a pin located in said slot, a gear connected with said shaft, and means including an index plate for transferring the motion of said gear to the spindle during each stroke of the carriage in one direction, said slot being so proportioned as to cause the indexing of the work.

16. A machine for milling twist drills and the like including in combination, a reciprocatory carriage provided with a work-carrying device, a slide connected with said carriage, a tool carrier provided with a grooving tool, a second tool-carrier provided with a backing-off tool, mechanism controlled by said slide for operating said carriers to throw said tools out of action at a predetermined point in the forward stroke of the carriage, means including a latch to hold the carriers out of action during the return stroke of the carriage, and means for tripping the latch at a predetermined point of said return stroke.

17. A milling machine including in combination, a work-carrier, a milling tool carrier, means for relatively moving the work and tool to form a longitudinal cut in the work, and means for vibrating the tool to control the width of said cut.

18. A milling machine including in combination, a work-carrier, a milling tool carrier, means for effecting a relative progressive movement between said carriers, and means for vibrating one of said carriers to control the width of the cut formed by the milling tool.

19. A milling machine including in combination, a work-carrier, a milling tool carrier, mechanism for relatively moving the work and milling tool in the direction of the length of the work to form a longitudinal groove, means for relatively moving the tool and work to vary the depth of the groove, and means for causing the tool to cut from side to side of the groove with a progressively increasing range of operation.

20. A milling machine including in combination, a work-carrier, a milling tool carrier, means for relatively moving the work and milling tool to produce a longitudinal groove in the work, and means for causing a side to side action of the tool to control the width of the groove.

21. A milling machine including in combination, a spindle having a work-holding chuck, means for rotating the spindle and moving it endwise, a milling tool carrier provided with a grooving tool, means for shifting said carrier during the grooving operation to vary the depth of the groove, means for vibrating the carrier during the grooving operation to control the width of the groove, and means independent of said chuck for supporting the work during the grooving operation.

22. A milling machine including in combination, a work-carrier, a milling tool carrier provided with a grooving tool, means for vibrating the tool during the grooving operation, and means independent of the work-carrier, for supporting the work to resist the vibrating action of the tool.

23. A milling machine including in combination, a work-carrying spindle, means for feeding the stock longitudinally through the spindle with the leading end projecting beyond the same, means carried by the spindle for chucking the stock, a milling tool for grooving said leading end, means for moving the spindle endwise, means for vibrating the tool during the grooving operation, and means for supporting the leading end of the stock to resist the vibrating action of the tool.

24. A milling machine including in combination, a carriage provided with a work-carrying spindle, a carriage provided with a groove-milling tool, means for reciprocating the spindle carriage to cause the tool to longitudinally groove the work, means for moving the tool carriage relatively to the work to cause the tool to vary the depth of the groove, and means for simultaneously causing the tool to cut from side to side of the groove with a progressive lateral action to control the width of the groove.

25. A machine for milling twist drills and the like including in combination, a work-carrier, a milling tool carrier provided with a grooving tool, means for relatively moving the work and tool carriage to cause the tool to longitudinally and spirally groove the work, means for varying the depth of the groove, and means for simultaneously causing the tool to cut from side to side of the groove with a progressively increasing range of action to control the width of the groove.

26. A machine for milling twist drills and the like including in combination, a work carrier, a milling tool carrier provided with a grooving tool, mechanism for relatively moving the work and tool carriers to cause the tool to longitudinally and spirally groove the work, means for relatively moving the work and tool carriers for varying the depth of the groove, means for causing the tool to cut from side to side of the groove with a progressively increasing range of action to control the width of the groove, and means for terminating the grooving operation at a predetermined point.

27. A milling machine including in combination, a work carrier, a milling tool carrier provided with a grooving tool, means for effecting a relative reciprocation between the work-carrier and tool longitudinally of the work, means operative during the relative movement of said parts in one direction to vary the depth of the groove, means for simultaneously causing a relative vibrating movement between the work and the tool to control the width of the groove, means for separating the tool and the work at a predetermined point in their relative movement longitudinally of the work, means for maintaining the tool and work in their separated condition during the relative movement of the work and tool in the opposite direction, and means for indexing the work prior to a succeeding grooving operation.

28. A milling machine including in combination, a work-carrying spindle, means for moving said spindle in an endwise direction, a tool-carrier provided with a grooving tool, and means for causing said tool to cut from side to side of the groove to control the width thereof during a predetermined portion of the motion of the spindle.

29. A machine for milling twist drills and the like including in combination, a work-carrier, a grooving tool, means for relatively moving the work and tool to form a spiral groove in the work, and means for giving the tool a vibratory motion of progressively increasing amplitude during the grooving operation.

30. A machine for milling twist drills and the like including in combination, a work carrier, a grooving tool, means for advancing the work and turning it with relation to the tool to form a spiral groove, means for gradually decreasing the depth of the groove, and means for giving the tool a vibrating motion of gradually increasing amplitude as the depth of the groove is decreased.

31. A machine for milling twist drills and the like including in combination, a work-carrier, a grooving tool, means for reciprocating the carrier with relation to the tool, means for rotating the carrier during each of a plurality of successive strokes in one direction whereby a plurality of spiral grooves are formed in the work, means for separating the tool and work during an intermediate stroke of the carrier in an opposite direction, means for indexing the work between the groove-forming strokes, means for effecting a relative movement between the work and the tool to gradually decrease the depths of the grooves, and means for effecting a relative vibratory movement between the work and the carrier of gradually increasing amplitude to control the width of the grooves.

32. A machine for milling twist drills and the like including in combination, a reciprocating work-carrier, an oppositely reciprocating member, a grooving tool, means driven from said oppositely reciprocating member for rotating the work during each reciprocation thereof in one direction, said means including an indexing device, means controlled by said oppositely reciprocating member for moving the tool to gradually decrease the depth of the groove and to separate the milling tool from the groove at a predetermined point in the reciprocation of the carriage, and means under the control of said oppositely reciprocating member for retaining said tool out of operative relation with the work during the reciprocation of the carriage in the opposite direction.

33. A machine for milling twist drills and the like including in combination, a reciprocating work-carrier, a member reciprocating in the opposite direction, means driven by said oppositely reciprocating member for rotating the work carrier during its strokes in one direction said means including an indexing device, a grooving tool, a locking it projects beyond the spindle, and a cutting-off tool rotatably mounted upon the spindle for cutting off the grooved end of the stock.

37. A machine for milling twist drills and the like including in combination, a hollow work-carrying spindle, means for intermittently feeding the stock through the spindle so that the leading end of the stock projects beyond the end of the spindle, means for securing the stock to the spindle between its feeding operations, milling tools for grooving and backing off the projecting end of the stock, means for reciprocating and rotating the spindle with relation to the tools to successively form a plurality of sets of grooving and backing-off cuts thereon, a cutting-off tool mounted on said spindle, and means for rotating said cutting-off tool to sever the leading end of the stock at the end of the last milling operation thereon.

38. A milling machine including in combination, a work-carrier, a tool carrier provided with a grooving tool, means for vibrating the tool transversely to the groove milled thereby, stop means for controlling the amount of the vibration, and means for operating the stop to effect a variation in the vibratory movement.

39. A milling machine including in combination, a work carrier, a tool carrier, means for applying a yieldable thrust to one of the carriers to impart a vibratory movement thereto, and independent means for causing a variation in the amount of said vibratory movement.

40. A milling machine including in combination, a work carrier, a tool carrier provided with a grooving tool, means including yielding connections for vibrating the tool in a direction transverse to the groove formed thereby, a stop device coöperating with said yielding connections, and means for moving the stop at the proper time to cause the variation in the amount of the vibration.

41. A machine for milling twist drills and the like including in combination, a work carrier, a reciprocating member connected with said work carrier, a tool carrier provided with a grooving tool, means for vibrating the grooving tool in a direction transverse to the groove milled thereby, a cam connected with said reciprocating member, mechanism operated by said cam for effecting a variation in the amplitude of the tool vibration, a second cam connected with said reciprocating member for gradually withdrawing the grooving tool and then suddenly throwing it out of action, a relieving tool, a third cam connected with said reciprocating member, means operating 42. In a machine for milling twist drills and the like, in combination, supports for a blank, cutters simultaneously operative on the same blank, one for grooving it and the other for relieving it, and means for causing the grooving cutter to lessen the depth of the groove as it approaches the upper part of the blank.

43. In a machine for twist drills and the like, in combination, supports for a drill-blank, cutters simultaneously operative on the blank for grooving and relieving it, and indexing means such that the relative position of said blank and the relieving cutter may be so varied that upon a subsequent operation of the cutter a different part of the blank is subjected to its action.

44. In a machine for milling twist drills, in combination, supports for a drill-blank, cutters simultaneously operative on the blank for grooving and relieving it, indexing means such that the relative position of the blank and the cutters may be so varied that upon a subsequent operation of the cutters a different portion of the blank is subjected to their action, and means for causing the grooving cutter to lessen the depth of the groove as it approaches the upper part of the blank.

45. In a machine for milling twist drills, in combination, supports for a drill-blank, cutters simultaneously operative on the blank for grooving and relieving it, indexing means such that the relative position of the blank and the cutters may be so varied that upon a subsequent operation of the cutters a different portion of the blank is subjected to their action; and means, rendered operative after said subsequent operation, for cutting said blank transversely.

46. In a machine for milling twist drills, in combination, supports for a blank, cutters simultaneously operative on the blank for grooving and relieving it, indexing means such that the relative position of the blank and the cutters may be so varied that upon a subsequent operation a different portion of the blank is subjected to their action, means for causing the grooving cutter to lessen the depth of said groove as it approaches the upper part of the blank, and means, rendered operative after said subsequent operation, for cutting said blank transversely.

47. A milling machine including in combination, a work carrier, a milling tool and a carrier therefor, and means adapted to effect a relative vibratory motion between said tool and the work to control the width of the cut formed by the milling tool.

48. A milling machine including in combination, a work carrier, a milling tool and a carrier therefor, means effecting a relative vibratory motion between said tool and the work to control the width of the cut formed by the milling tool, and means for causing a relative rotary movement and a simultaneous relative longitudinal movement between the work and said tool to effect spiral grooving of the work.

49. In a machine for milling twist drills, supports for a blank, a chuck for a rod from which the blank may be formed, cutters for grooving the blank and relieving it, means for causing the grooving cutter to lessen the depth of the groove as it approaches the upper part of the blank, indexing means for adjusting the blank to a different position after one groove is formed, means for then forming a subsequent groove or grooves, and means for cutting off the blank from the stock and advancing the latter to a new position, with means for stopping the machine when the stock becomes exhausted; the said several means being so timed and operating that the blank is grooved correctly, relieved, cut off, ejected from the machine, and the stock advanced to form a new blank automatically, and in succession.

In testimony whereof I affix my signature in presence of two witnesses.

FRIEDERICH MÜLLER.

Witnesses:
 Miss E. A. BOURDON,
 MARGARET L. MULLALY.